(12) United States Patent
Kanayama et al.

(10) Patent No.: US 10,015,076 B2
(45) Date of Patent: Jul. 3, 2018

(54) NETWORK PROCESSOR, COMMUNICATION DEVICE, PACKET TRANSFER METHOD, AND COMPUTER-READABLE RECORDING MEDIUM

(71) Applicant: FUJITSU LIMITED, Kawasaki-shi, Kanagawa (JP)

(72) Inventors: Yasutaka Kanayama, Inagi (JP); Motoyuki Tanisho, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 15/155,182

(22) Filed: May 16, 2016

(65) Prior Publication Data

US 2017/0012855 A1   Jan. 12, 2017

(30) Foreign Application Priority Data

Jul. 9, 2015   (JP) ................................ 2015-138124

(51) Int. Cl.
| | |
|---|---|
| *H04L 12/28* | (2006.01) |
| *H04L 12/755* | (2013.01) |
| *H04L 12/741* | (2013.01) |
| *H04L 12/861* | (2013.01) |
| *H04L 12/24* | (2006.01) |

(52) U.S. Cl.
CPC ........ *H04L 45/021* (2013.01); *H04L 41/0813* (2013.01); *H04L 45/54* (2013.01); *H04L 49/90* (2013.01); *H04L 41/085* (2013.01)

(58) Field of Classification Search
CPC ... H04L 45/021; H04L 49/90; H04L 41/0813; H04L 45/54; H04L 41/085
See application file for complete search history.

(56) References Cited

U.S. PATENT DOCUMENTS

| | | | |
|---|---|---|---|
| 2001/0007560 A1* | 7/2001 | Masuda | ............ H04Q 11/0478 370/401 |
| 2006/0059196 A1* | 3/2006 | Sato | ................. G06F 17/30985 |
| 2007/0160052 A1* | 7/2007 | Okada | .................. H04L 45/742 370/392 |
| 2009/0028152 A1* | 1/2009 | Shimonishi | ......... H04L 49/3081 370/392 |
| 2009/0240850 A1* | 9/2009 | Li | ........................ H04L 47/52 710/54 |

(Continued)

FOREIGN PATENT DOCUMENTS

JP         2007-208963         8/2007

*Primary Examiner* — Clemence S Han
(74) *Attorney, Agent, or Firm* — Fujitsu Patent Center

(57) ABSTRACT

A managing unit adds update information to an entry to be updated of a table updated prior to a change of a network configuration, and deletes the update information when the update of the table caused by the change of the network configuration is completed. A packet processing unit executes a plurality of pipeline processes using the table sequentially, and suspends executing the pipeline processes when the update information is added to any entry of the table. A reprocessing control unit stores an input packet in a reprocessing queue when the pipeline processes executed by the packet processing unit is suspended, and transfers the packet stored in the reprocessing queue to the input queue when update of the table to which the update information is added is all completed.

9 Claims, 14 Drawing Sheets

(56) References Cited

U.S. PATENT DOCUMENTS

2013/0322450 A1* 12/2013 Ueta ..................... H04L 45/74
  370/392
2016/0373364 A1* 12/2016 Yokota ................ H04L 12/6418

* cited by examiner

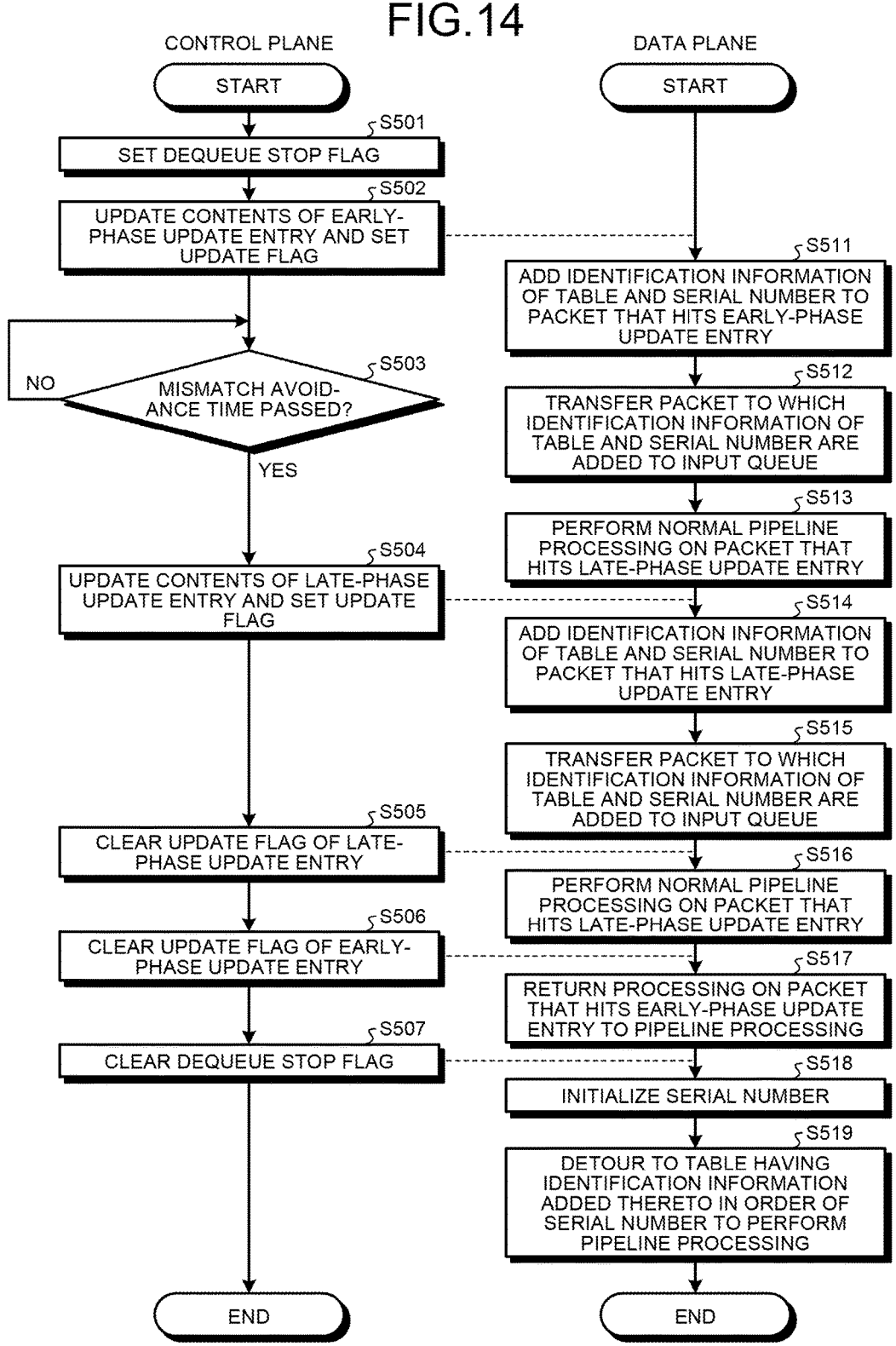

NETWORK PROCESSOR, COMMUNICATION DEVICE, PACKET TRANSFER METHOD, AND COMPUTER-READABLE RECORDING MEDIUM

CROSS-REFERENCE TO RELATED APPLICATION(S)

This application is based upon and claims the benefit of priority of the prior Japanese Patent Application No. 2015-138124, filed on Jul. 9, 2015, the entire contents of which are incorporated herein by reference.

FIELD

The embodiments discussed herein are related to a network processor, a communication method, a packet transfer device, and a computer-readable recording medium.

BACKGROUND

In recent years, with the increase of network traffic, special processors called network processor dedicated to high-speed packet processing have been greatly developed. Network processors are processors specialized for processing network traffic. A network processor functions as a network interface in an information processing device, and performs packet processing and the like.

Network processors are programmable processors, and can change configurations of codes and queues of a pipeline, and peripheral resources including a memory and a table. An information processing device generally includes, in addition to the network processor, peripheral hardware such as a central processing unit (CPU) and a field programmable gate array (FPGA), a table, and the like. By downloading setting data, such as pipeline codes and register setting, written in a flash memory or the like to the network processor via the CPU, configuration is performed. Moreover, there is a case that configuration of the network processor is performed on command basis from the CPU through an application programming interface (API).

Network processors have an architecture separated into a control plane that performs a route control and the like and a data plane that performs packet transfer processing. The data plane has a pipeline structure, and performs packet processing of transfer destination determination and the like at high speed, referring to information in a table. The control plane controls operation and configuration of the data plane, through the API. The processing performed by the control plane includes table update processing.

As for pipeline processing performed in the data plane, processing to be performed is fixed in each phase, and a table to be accessed is also fixed in each phase. The network processor has a packet memory, and a packet of a subject of processing is shifted in the packet memory with transition of phase in the pipeline processing.

Furthermore, the table used in the pipeline processing is stored in a ternary content addressable memory (TCAM) or a random access memory (RAM). The network processor reads information in the table by using a search key or an address. The search key and the addresses are determined based on an input port number, information included in an input packet, a table read result in a previous stage, and the like.

A network administrator updates various kinds of tables when the network configuration is to be changed. In some cases, the network administrator updates more than one table.

As a conventional technique relating to network processors, there has been a technique in which a header including a search key is allocated to a received packet, and processing is performed in stages while repeating communication transmission and reception of the packet between a packet processing unit and a search engine (Japanese Patent Laid-open Publication No. 2007-208963).

However, when multiple tables are to be changed, there is a possibility of occurrence of a state in which consistency is lost between information in a table that has already been updated and information in a table that has not been updated. In that case, if the pipeline processing is performed using those tables under the condition that a table that has been updated and a table that has not been updated are not consistent, an improper processing result can be obtained.

Accordingly, to prevent the inconsistency occurring at the time of changing multiple tables, the following method has conventionally been applied to processing. The method is to suspend all processing temporarily in a network processor until update of all tables is completed, to disable dequeue and accumulate in an input queue, and then to enable dequeue to resume the pipeline processing after the update of all tables is completed. By processing by such a procedure, packet processing is performed in a state in which all tables are updated without inconsistency.

However, when the number of accumulated queues reaches an upper limit of the queue memory, packets overflowing therefrom are discarded. The discarded packets are to be retransmitted, to cause increase of traffic or transmission delay of packets, resulting in throughput degradation of the information processing device. In the method of suspending all processing and accumulating all input packets in queues, many packets can be discarded to degrade the throughput of the information processing device.

SUMMARY

According to an aspect of an embodiment, a network processor includes: a managing unit that adds update information to an entry to be updated of a table updated prior to a change of a network configuration, and that deletes the update information when the update of the table caused by the change of the network configuration is completed; a packet processing unit that executes a plurality of pipeline processes using the table in sequence for a packet input to an input queue, and that suspends executing the pipeline processes when the update information is added to any entry of the table; and a reprocessing control unit that stores an input packet in a reprocessing queue when the pipeline processing executed by the packet processing unit is suspended, and that transfers the packet stored in the reprocessing queue to the input queue when update of the table to which the update information is added is all completed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 depicts processing performed on a packet to which a serial number is added when a dequeue stop flag is on;

FIG. 14 is a flowchart of processing at the time of table update performed by the network processor according to a second modification.

DESCRIPTION OF EMBODIMENTS

Preferred embodiments of the present invention will be explained with reference to accompanying drawings. Note that the network processor, communication device, the packet transfer method, and the computer-readable recording medium disclosed in the present application are not limited to the embodiments below.

[a] First Embodiment

Figure 1:
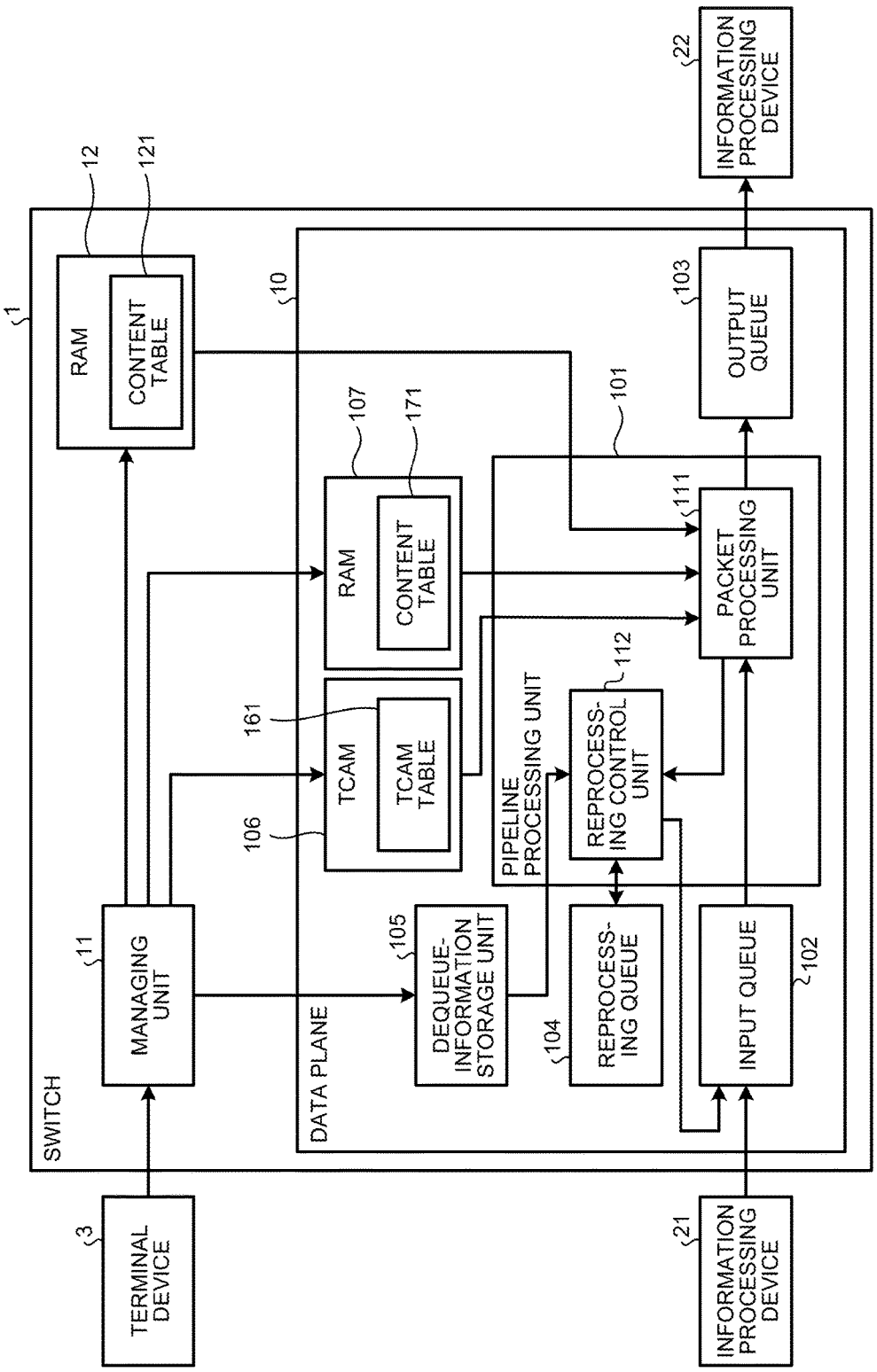
FIG. 1 is a block diagram of a switch according to a first embodiment.

FIG. 1 is a block diagram of a switch according to a first embodiment. A switch 1 relays communication between an information processing devices 21 and 22. Moreover, to the switch 1, a terminal device 3 for control command input is connected. Furthermore, the switch 1 includes a data plane 10 of a network processor, a managing unit 11, and a random access memory (RAM) 12. The managing unit 11 corresponds to a control plane of a network processor. That is, a combination of the data plane 10 and the managing unit 11 is one example of the network processor.

The managing unit 11 receives a control command including a table update instruction input by the terminal device 3. Table update occurs, for example, when a network configuration is changed. When receiving a table update instruction, the managing unit 11 sets a dequeue stop flag stored in a dequeue-information storage unit 105 described later, that is, sets a value indicating stop of dequeue. Furthermore, the managing unit 11 updates the table. It is explained herein with an example of updating a content table 121 stored in the RAM 12 and a content table 171 stored in a RAM 107 described later. Moreover, although a case of updating the content tables 121 and 171 by the managing unit 11 is explained this time, the managing unit 11 may update a TCAM table 161 of a TCAM 106 described later. This TCAM table 161 and the content tables 121 and 171 correspond to an example of a "table updated prior to a change of a network configuration".

Table update performed by the managing unit 11 is explained in detail below. The managing unit 11 has details stored therein in advance of processing in each phase in pipeline processing that is performed by a pipeline processing unit 101 described later. The managing unit 11 determines either one of the content tables 121 and 171 is used in an earlier phase in the processing. In this example, a case in which the content table 121 is used in an earlier phase is explained.

The managing unit 11 sets an update flag of an entry to be updated in the content table 121 to on. That the update flag is on indicates that the entry is an entry to be updated. This update flag corresponds to "update information". Hereinafter, an entry of a subject of update is referred to as "update entry".

Thereafter, the managing unit 11 stays on standby for sufficient time for all of packets that have already been processed using an update entry in the content table 121 before update, to be processed using the content table 171 in a subsequent phase. Hereinafter, this standby time of the managing unit 11 is referred to as "mismatch avoidance time". There can be packets that have already been processed using the content table 121 between a phase of processing with the content table 121 and a phase of processing with the content table 171. Therefore, when an update entry of the content table 171 is updated soon after an update entry of the content table 121 is updated, following mismatch can occur. Specifically, packets that have been processing using an update entry of the content table 121 before update can be processed using an update entry of the content table 171 after update. In this case, there is a mismatch between respective update entries of the content table 121 and the content table 171, and accordingly, it is difficult for the packets packet processing unit 111 to be processed correctly. Therefore, the managing unit 11 holds update of the content table 171 for a period of the mismatch avoidance time. This enables to prevent packets that have been processed using an update entry of the content table 121 before update from being processed using an update entry of the content table 171 after update.

After the mismatch avoidance time passes, the managing unit 11 sets an update flag of an update entry in the content table 171. Thereafter, the managing unit 11 updates a content of the update entry in the content table 171. The managing unit 11 then clears the update flag of the update entry in the content table 171. For packets that are input from an input queue 102 as described later, processing in the phase of processing with an update entry of the content table 121 is suspended, and the packets are sent to a reprocessing queue 104. Therefore, after the update mismatch avoidance time passes, packets are rarely sent to the phase of processing with an update entry of the content table 171. Therefore, if the mismatch avoidance time is provided sufficiently, setting on and off of the update flag of an update entry of the content table 171 by the managing unit 11 becomes unnecessary.

Furthermore, after clearing the update flag of the update entry of the content table 171, the managing unit 11 clears the update flag of the update entry of the content table 121. That is, the managing unit 11 clears the update flags of the update entries of the respective tables when update of the content table 121 and the content table 171 caused by a change of the network configuration is completed. Clearing an update flag of an update entry corresponds to "deletion of update information".

Thereafter, the managing unit 11 clears the dequeue stop flag of the dequeue-information storage unit 105. This enables dequeue from the reprocessing queue 104 to be started.

The RAM 12 is a storage device that is arranged at a position other than the data plane 10 on the switch 1. In the present embodiment, because the content table 121 used by the data plane 10 is large, the content table 121 is stored in the RAM 12 that has a large storage area and is arranged at a position other than the data plane 10. However, there is a case that the data plane 10 does not use a storage device such as the RAM 12 arranged at a position other than the data plane 10.

The data plane 10 includes the pipeline processing unit 101, the input queue 102, an output queue 103, the reprocessing queue 104, the dequeue-information storage unit 105, the TCAM 106, and the RAM 107.

The TCAM 106 includes a TCAM table 161. Moreover, the RAM 107 includes the content table 171.

The dequeue-information storage unit 105 has a dequeue stop flag that indicates whether to stop dequeue of the reprocessing queue 104. The dequeue-information storage unit 105 sets the dequeue stop flag when update of the content tables 121 and 171 occurs, instructed by the managing unit 11. Moreover, the dequeue-information storage unit 105 clears the dequeue stop flag when the update of the content tables 121 and 171 is completed, instructed by the managing unit 11.

The reprocessing queue 104 accepts an input of packets from a reprocessing control unit 112. Thereafter, the reprocessing queue 104 outputs the packets in order of occurrence, receiving an output instruction of packets from the reprocessing control unit 112.

The input queue 102 receives an input of packets from the information processing device 21. Furthermore, the input queue 102 receives an input of packets that has been suspended to be processed, from the reprocessing control unit 112. The input queue 102 outputs the packets to a packet processing unit 111 in order of input.

The output queue 103 receives an input of the packets from the packet processing unit 111, and outputs the acquired packets to the information processing device 22 in order of input.

The pipeline processing unit 101 performs pipeline processing on the packets acquired from the input queue 102. The pipeline processing unit 101 includes the packet processing unit 111 and the reprocessing control unit 112.

The packet processing unit 111 acquires packets from the input queue 102. The packet processing unit 111 performs processing determined per phase on the packets. Thereafter, the packet processing unit 111 outputs the packets subjected to processing of all phases to the output queue 103.

The processing performed by the packet processing unit 111 is specifically explained. The packet processing unit 111 performs Ingress processing on acquired packets. Thereafter, the packet processing unit 111 performs Egress processing on packets to be output.

Ingress processing includes, for example, virtual identifier (VID) conversion, filtering processing, layer (L) 3 lite function, Classify, MAC search, Loop detection, link aggregation (LAG) Hash, and Policer processing. Classify is processing of classifying packets according to priority. LAG Hash is link aggregation processing of making multiple physical lines into a single logical line. Policer is processing of rate control of adjusting a rate of an input port to a contract rate or a peak rate.

Egress processing includes, for example, Multicast processing, filtering processing, VID conversion, MAC learning, and Shaper processing. Multicast processing is processing of controlling transfer destination of a multicast packet. VID conversion is processing of converting an identifier (ID) of virtual local area network (VLAN). MAC learning is processing of associating a MAC address and a transfer destination. Shaper processing is processing of rate control of adjusting a rate of an output port to a contract rate or a peak rate.

The packet processing unit 111 performs the above processing on packets in the pipeline processing. The pipeline processing is processing in which processing to be performed in each phase that expresses a stage of processing is fixed. The packet processing unit 111 moves packets corresponding to a phase. The packet processing unit 111 maintains the state as it is, when there is no processing to be performed on one packet in one phase, without performing any processing during the period of the phase.

Figure 2:
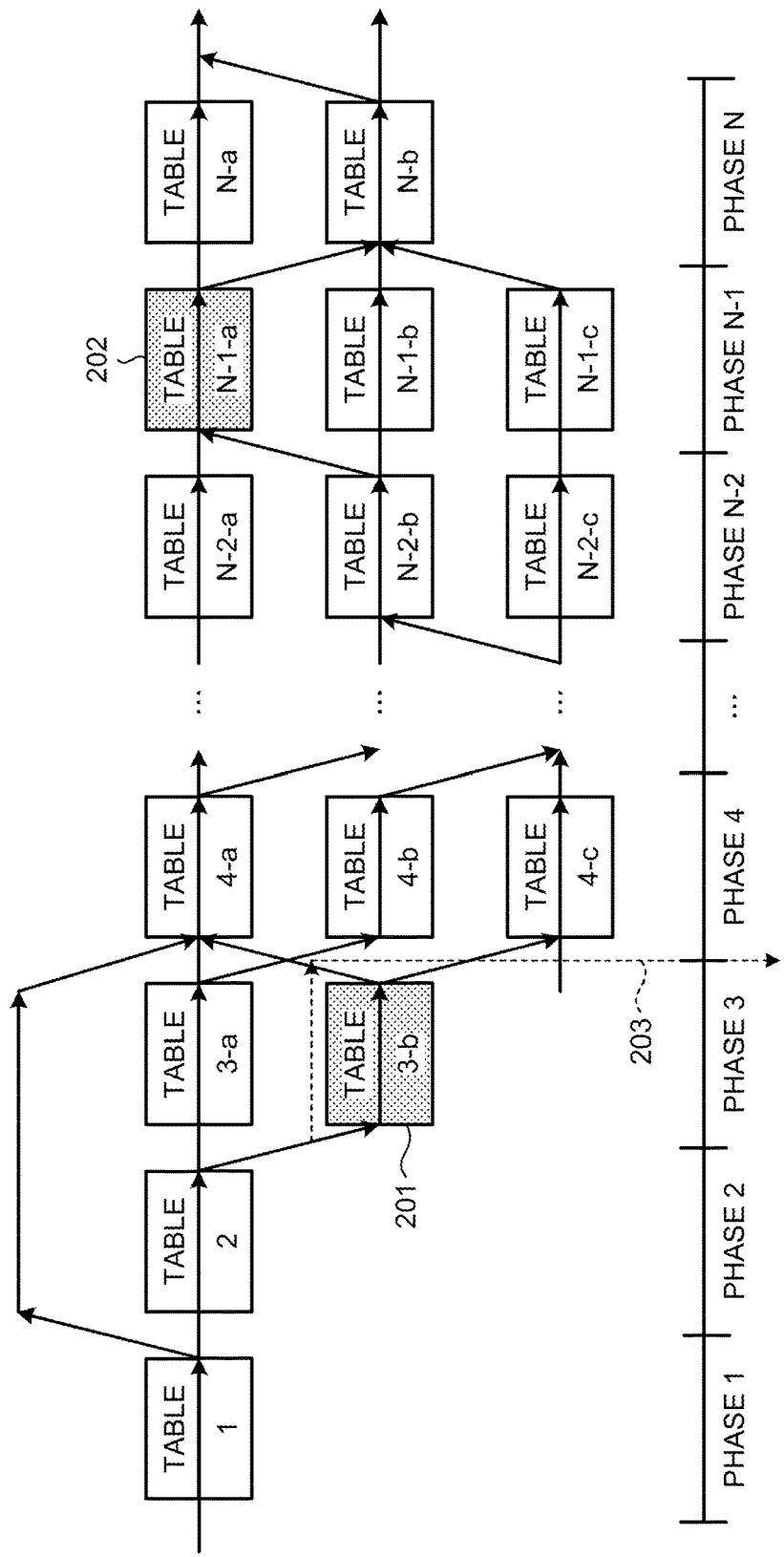
FIG. 2 depicts one example of pipeline processing during table update by a network processor according to the first embodiment.

FIG. 2 depicts one example of the pipeline processing during table update by a network processor according to the first embodiment. In FIG. 2, processing using tables is extracted to be described. Packets are processed along an arrow. A rectangular element with a word, TABLE on an upper part and a reference symbol at a lower part in FIG. 2 expresses processing to be performed using a table having the reference symbol as identification information. The identification information is expressed with a combination of a number assigned to a phase in which the table is used and an identifier of the table in the phase. For example, processing 201 is performed in the third phase using a table 3-b. As described, tables practically the same are handled as different tables in the pipeline processing, if positions of processing using the tables are different. Moreover, in FIG. 2, a line that passes through a phase without performing any processing in that phase is detoured around the processing in the phase, that is, the line expresses a packet bypassing the processing in the phase. Furthermore, a table 3-b used in the processing 201 is the content table 121 that is stored in the RAM 12, and a table N–1-a used in a processing 202 is the content table 171 that is stored in the RAM 107.

The packet processing unit 111 determines whether an update flag is set when performing the processing 201 by using an entry of the content table 121. The update flag is not set when the update entry of the content table 121 is not updated, and, therefore, the packet processing unit 111 performs the processing 201 on the packet and proceeds to a next phase.

To the contrary, when an entry hit by the packet in the processing 201 is the update entry and the update flag is set, the packet processing unit 111 puts the packet that hits the update entry on standby during Phase 3. Thereafter, the packet processing unit 111 adds identification information of the table 3-b to the packet that hits the update entry. The packet processing unit 111 then outputs the packet that hits the update entry in the reprocessing control unit 112. A broken arrow 203 in FIG. 2 expresses an output of the packet that hits the update entry to the reprocessing control unit 112. The packet processing unit 111 continues to output a packet that hits the update entry to the reprocessing control unit 112, until the update flag of the update entry of the content table 121 is cleared.

Furthermore, the packet processing unit 111 continues the processing using the table N–1-a on a packet in the processing 202 during the mismatch avoidance time, while transmitting the packet that hits the update entry in the processing 201 to the reprocessing control unit 112. Thereafter, when the mismatch avoidance time passes, an update flag of an update entry of the content table 171 is set. The packet processing unit 111 outputs a packet that hits the update entry in the processing 202 to the reprocessing control unit 112. If the mismatch avoidance time is sufficiently provided, and no packets remain between the processing 201 and the processing 202, a packet is not supposed to hit the update entry in the processing 202 in an actual case. In other words, the packet processing unit 111 is not supposed to output a packet that hits the update entry in the processing 202 to the reprocessing control unit 112.

Subsequently, when the update entry of the content table 171 is updated, the update flag of the update entry of the content table 171 is cleared. The packet processing unit 111 returns to a state of performing the processing using the table N−1-a on the packet input in the processing 202.

Subsequently, when the update entry of the content table 121 is updated, the update flag of the update entry of the content table 121 is cleared. The packet processing unit 111 returns to a state of performing the processing using the table 3-b on the packet input in the processing 201.

Subsequently, the packet processing unit 111 determines whether identification information of the table 3-b or N−1-a is added to the packet acquired from the input queue 102. When the identification information of the table 3-b or N−1-a is not added, the packet processing unit 111 performs the normal pipeline processing on the acquired packet sequentially from Phase 1.

Figure 3:
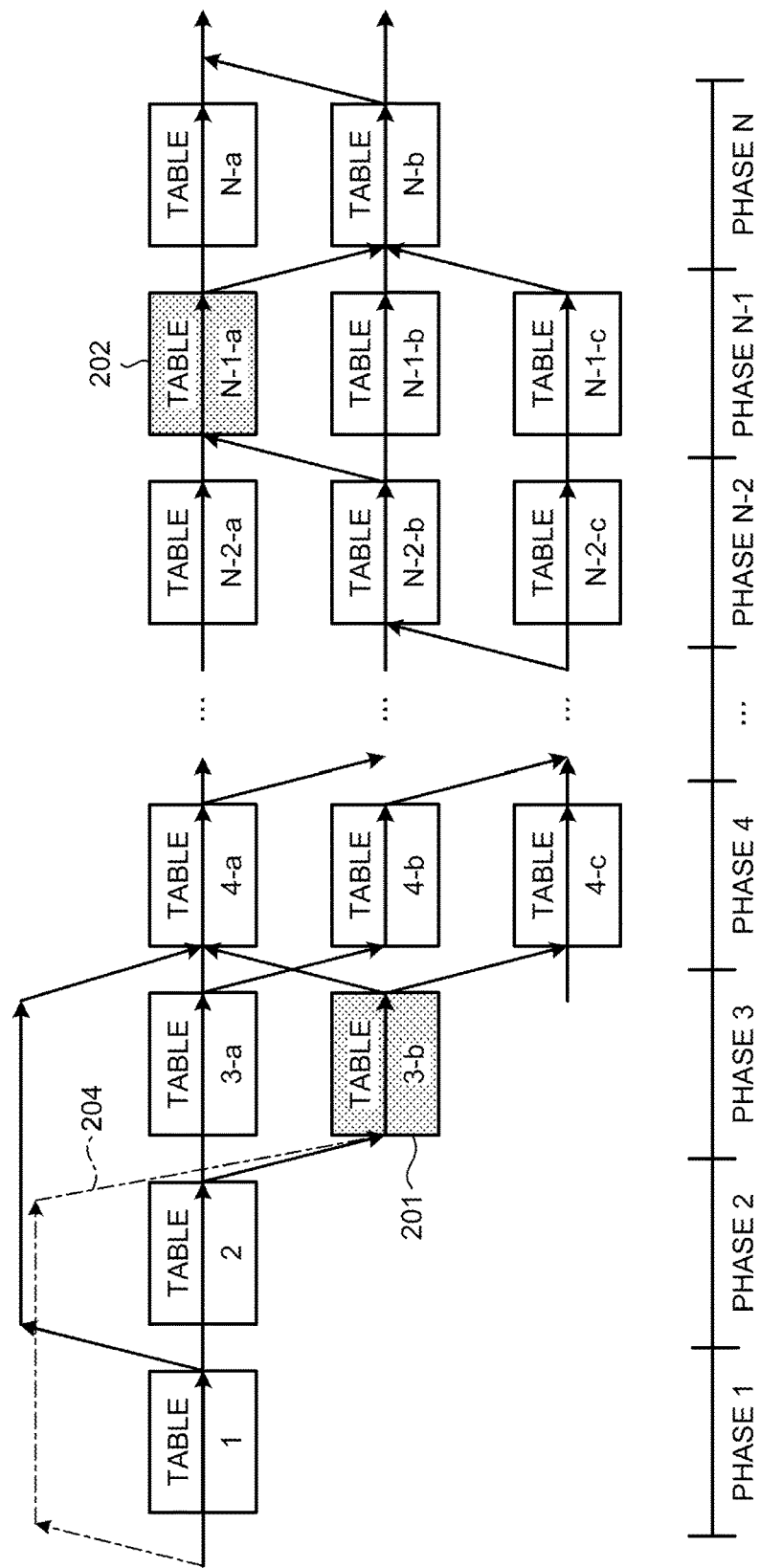
FIG. 3 is a diagram for explaining a flow of processing of packets stored in a reprocessing queue after table update in the first embodiment.

On the other hand, when the identification information of the table 3-b is added to the packet, the packet processing unit 111 detours the packet bypassing to Phase 3 as indicated by a long-and-short dashed arrow 204 in FIG. 3. FIG. 3 is a diagram for explaining a flow of processing of packets stored in a reprocessing queue after table update in the first embodiment. The packet processing unit 111 performs the processing 201 using the updated table 3-b on the detoured packet, and then sequentially performs processing of later phases. In this case, because the content tables 121 and 171 are both updated, mismatch is not caused even when the processing 201 and the processing 202 using the those are performed.

Moreover, when the identification information of the table N−1-a is added to the packet, the packet processing unit 111 detours the packet bypassing to Phase N−1, and resumes the pipeline processing from the processing 202.

Figure 4:
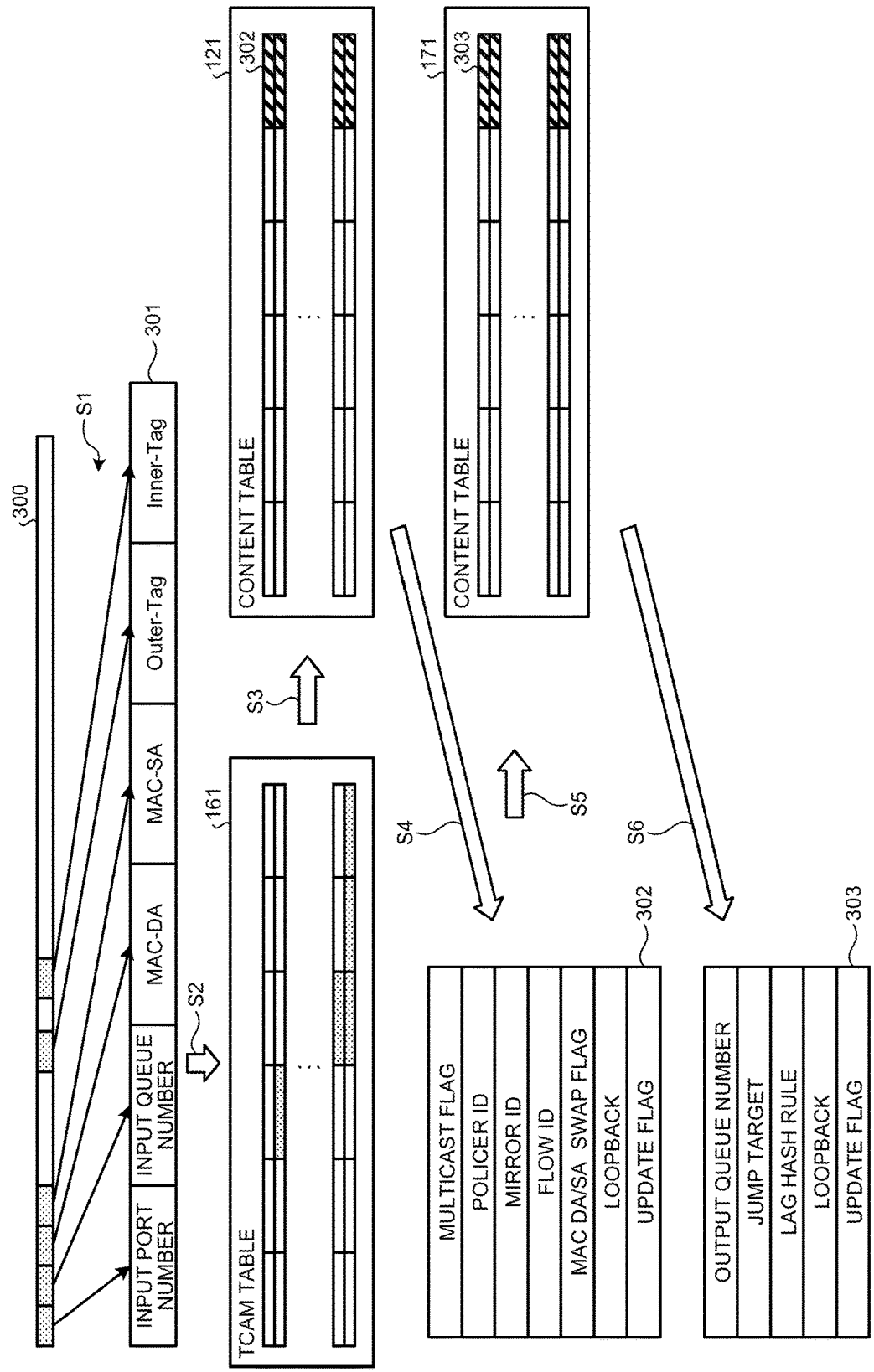
FIG. 4 depicts a flow of the pipeline processing using tables.

Furthermore, an overview of a flow of the pipeline processing performed in the present embodiment is explained referring to FIG. 4. FIG. 4 depicts a flow of the pipeline processing using tables. In this example, a case of performing a search using the TCAM table 161 before using the content table 121 is explained. Note that processing in other phases exist between the respective processing but illustration of those phases in between is omitted.

The packet processing unit 111 acquires a search key 301 from a predetermined address of an acquired packet 300 (step S1).

Next, the packet processing unit 111 searches the TCAM table 161 using the search key 301, and extracts a hit entry (step S2).

Subsequently, the packet processing unit 111 searches the content table 121 with an entry hit in the TCAM table 161 (step S3). To the entry of the content table 121, an update flag 302 is added.

The packet processing unit 111 acquires a content of the entry hit in the content table 121 (step S4). This processing of searching the content table 121 corresponds to one example of the processing 201 in FIG. 2. The packet processing unit 111 adds identification information of the table to the packet having information used before search if the update flag 302 is on, and outputs the packet to the reprocessing queue 104.

On the other hand, when the update flag 302 is off, the packet processing unit 111 searches the content table 171 using the content acquired from the content table 121 (step S5). To an entry of the content table 171, an update flag 303 is added.

The packet processing unit 111 acquires a content of an entry hit in the content table 171 (step S6). This processing of searching the content table 171 corresponds to one example of the processing 202 in FIG. 2. The packet processing unit 111 adds identification information of the table to the packet having information used before search if the update flag 303 is on, and outputs the packet to the reprocessing queue 104.

On the other hand, when the update flag 303 is off, the packet processing unit 111 ends the pipeline processing using the content acquired from the content table 171.

The packet processing unit 111 is assumed to search the content table 171 by using a flow ID that is acquired from the content table 121. A case in which the content table 121 is updated and the flow ID acquired from the content table 121 is changed from #A to #D is explained. In this case, as the content table 121 has been updated, the flow ID acquired from the content table 121 by the packet processing unit 111 is #D. However, if the content table 171 has not been updated at this time, the packet processing unit 111 is going to get information corresponding to the flow ID #D before update from the content table 171. It is desirable that the packet processing unit 111 acquire information corresponding to the flow ID #A if the information is before update. As a result, a mismatch occurs in the processing in this case.

To the contrary, the packet processing unit 111 according to the present embodiment uses the content table 171 subjected to update during the mismatch avoidance time to process a packet that has been processed using the content table 121 before update. In addition, after update of the content table 121, the packet processing unit 111 suspends processing using the update entry of the content table 121 until the content table 171 is updated. In other words, the packet processing unit 111 according to the present embodiment uses the content table 171 subjected to update to process a packet that has been processed with the content table 121 subjected to update. Thus, the packet processing unit 111 can avoid a mismatch in the processing.

Explanation is continued, referring back to FIG. 1. The reprocessing control unit 112 receives a packet that is suspended to be processed, input from the packet processing unit 111. The reprocessing control unit 112 stores packets suspended to be processed sequentially in the reprocessing queue 104.

The reprocessing control unit 112 checks the dequeue stop flag of the dequeue-information storage unit 105. When the dequeue stop flag is on, the reprocessing control unit 112 holds the packets stored in the reprocessing queue 104 as they are. To the contrary, when the dequeue stop flag is off, the reprocessing control unit 112 transfers the packets stored in the reprocessing queue 104 to the input queue 102 in order of storage.

Figure 5:
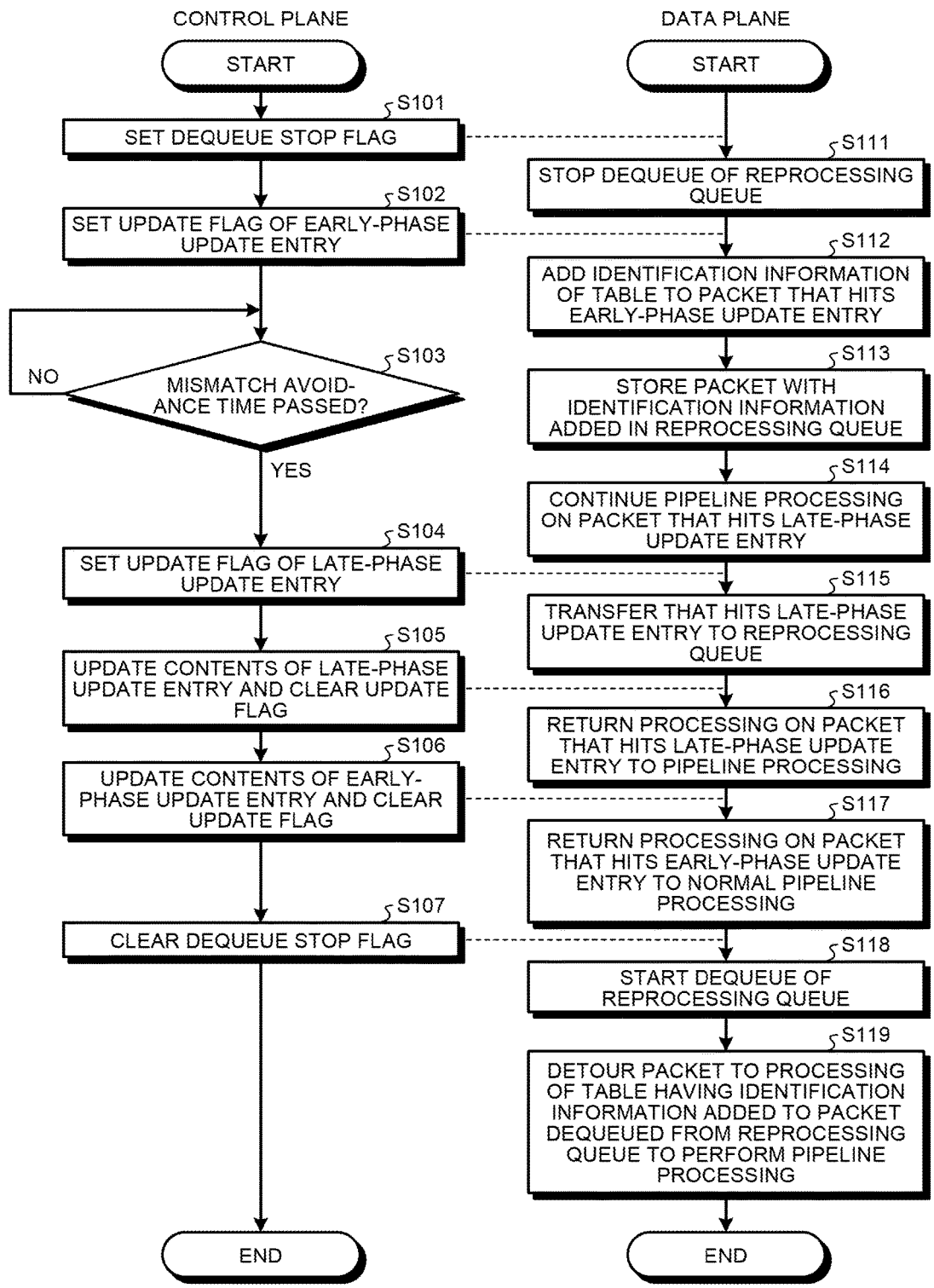
FIG. 5 is a flowchart of table update performed by the network processor according to the first embodiment.

Next, a flow of processing at the time of table update performed by the network processor according to the present embodiment is explained referring to FIG. 5. FIG. 5 is a flowchart of processing at the time of table update performed by the network processor according to the first embodiment. A flow on the left indicates processing performed by the control plane, namely the managing unit 11. A flow on the right indicates processing performed by the data plane 10. Furthermore, doted lines extending from the left to the right indicate that processing between the doted lines are performed in the data plane during a period from processing from which a dotted line extends until processing from which a next dotted line extends.

The managing unit 11 sets the dequeue stop flag of the dequeue-information storage unit 105 to on when update of a table occurs (step S101).

Subsequently, the managing unit 11 sets the update flag of an update entry used in an earlier phase (hereinafter, "early-phase update entry") to on (step S102).

Subsequently, the managing unit 11 determines whether the mismatch avoidance time has passed (step S103). When the mismatch avoidance time has not passed (step S103: NO), the managing unit 11 returns to step S103 to be on standby.

On the other hand, when the mismatch avoidance time has passed (step S103: YES), the managing unit 11 sets the update flag of an update entry used in a later phase (hereinafter, "late-phase update entry") to on (step S104).

Subsequently, the managing unit 11 updates a content of the late-phase update entry, and clears the update flag (step S105).

Subsequently, the managing unit 11 updates a content of the early-phase update entry, and clears the update flag (step S106).

Thereafter, the managing unit 11 clears the dequeue stop flag of the dequeue-information storage unit 105 (step S107).

On the other hand, in the data plane 10, following processing is performed. The reprocessing control unit 112 confirms that the dequeue stop flag of the dequeue-information storage unit 105 is on, and suspends dequeue of the reprocessing queue 104 (step S111).

The packet processing unit 111 confirms that the update flag of the early-phase update entry is on, and suspends processing for a packet that hits the early-phase update entry, and adds identification information of the table to the packet (step S112).

The packet processing unit 111 outputs the packet to which the identification information of the table is added, to the reprocessing control unit 112. The reprocessing control unit 112 stores the input packet in the reprocessing queue 104 (step S113).

Furthermore, the packet processing unit 111 continues the pipeline processing on the packet that hits the late-phase update entry during the mismatch voidance time (step S114).

Thereafter, the packet processing unit 111 confirms that the update flag of the late-phase update entry is on, and outputs the packet that hits the late-phase update entry to the reprocessing control unit 112. The reprocessing control unit 112 stores the input packet in the reprocessing queue 104 (step S115).

Subsequently, the packet processing unit 111 confirms that the update flag of the late-phase update entry is cleared, and returns the processing for the packet that hits the late-phase update entry to the pipeline processing (step S116).

Furthermore, the packet processing unit 111 confirms that the update flag of the early-phase update entry is cleared, and returns the processing for the packet that hits the early-phase update entry to the pipeline processing (step S117).

The reprocessing control unit 112 confirms that the dequeue stop flag is off, and starts dequeue of the reprocessing queue 104 (step S118).

Thereafter, acquiring a packet dequeued from the reprocessing queue 104, the packet processing unit 111 detours the packet bypassing to processing that uses a table having identification information added to the packet, and performs the pipeline processing (step S119).

Figure 6:
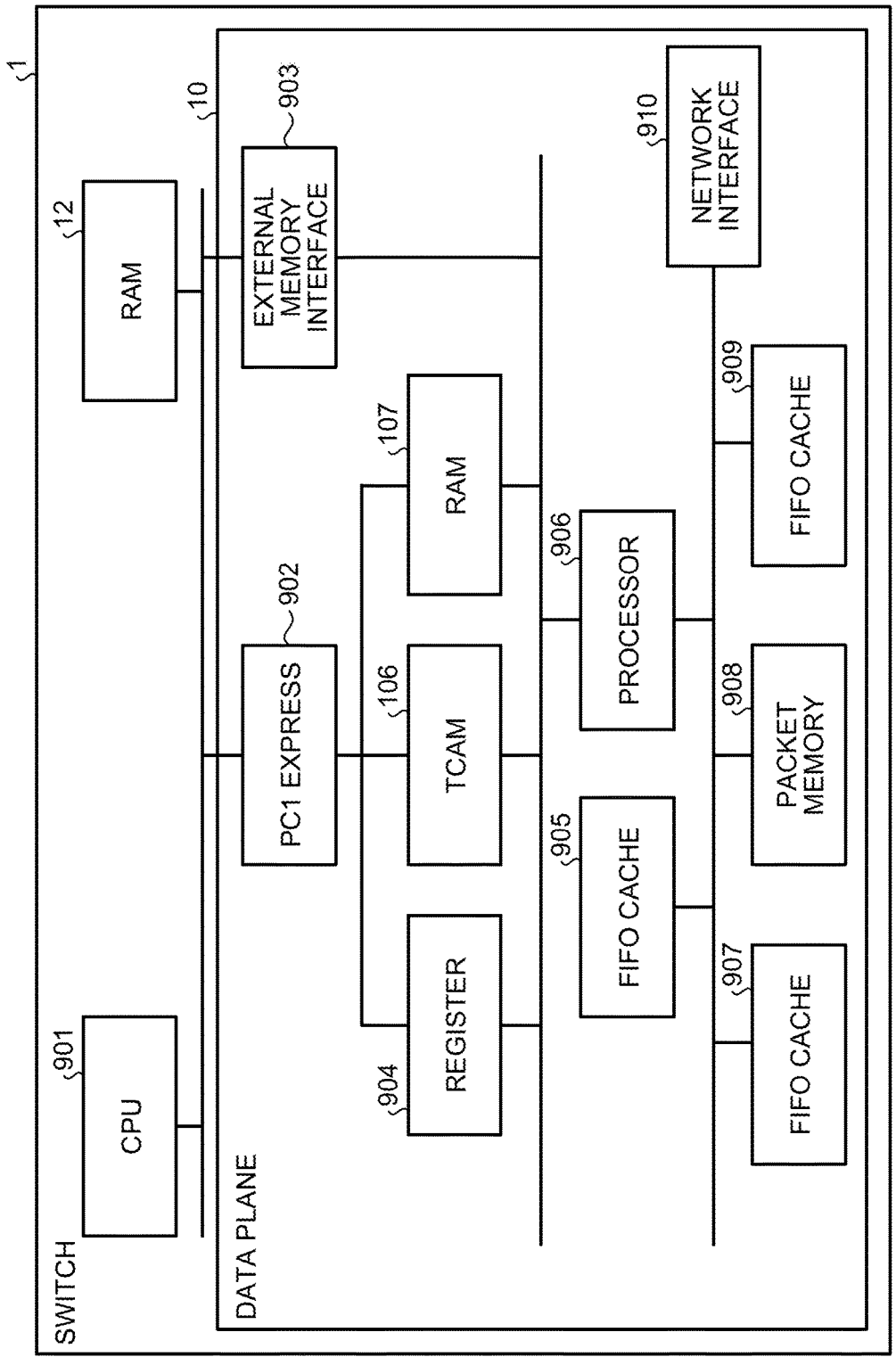
FIG. 6 is a hardware configuration diagram of the switch according to the first embodiment.

FIG. 6 is a hardware configuration diagram of the switch according to the first embodiment. As depicted in FIG. 6, the switch 1 includes the RAM 12, the TCAM 106, and the RAM 107, similarly to FIG. 1. In addition, the switch 1 includes a CPU 901, a peripheral component interconnect (PCI) express 902, an external memory interface 903, a register 904, a first-in first-out (FIFO) cache 905, and a processor 906. Furthermore, the switch 1 includes a FIFO cache 907, a packet memory 908, a FIFO cache 909, and a network interface 910.

The CPU 901 implements the function of the control plane of the network processor that includes the function of the managing unit 11 depicted in FIG. 1. The CPU 901 is connected to the RAM 12 through a bus. Moreover, the CPU 901 is connected to the register 904, the TCAM 106, and the RAM 107 through the PCI express 902. The register 904 implements the function of the dequeue-information storage unit 105 depicted in FIG. 1.

The processor 906 is connected to the register 904, the TCAM 106, and the RAM 107 through a bus. Furthermore, the processor 906 is connected to the RAM 12 through the external memory interface 903. Furthermore, the processor 906 is connected to the FIFO caches 905, 907, and 909, and the packet memory 908 through a bus. Moreover, the processor 906 is connected to an external information processing apparatus through the network interface 910.

The FIFO cache 905 implements the function of the reprocessing queue 104 depicted in FIG. 1. Furthermore, the FIFO cache 907 implements the function of the input queue 102 depicted in FIG. 1. Moreover, the FIFO cache 909 implements the function of the output queue 103 depicted in FIG. 1.

Furthermore, the processor 906 and the packet memory 908 implement the function of the pipeline processing unit 101 including the packet processing unit 111 and the reprocessing control unit 112 depicted in FIG. 1. Particularly, the processor 906 manages a packet stored in the packet memory 908 per phase, and performs the processing of the packet processing unit 111.

As explained above, the network processor according to the present embodiment sets an update flag for an update entry at the time of table update, sets a dequeue stop flag, and stores a packet that hits the entry for which the flag is set, in a reprocessing queue. When the dequeue stop flag is cleared, the network processor according to the present embodiment transfers the packet from the reprocessing queue to the input queue. As described, only a packet that hits an update entry is put on standby, thereby enabling to process packets not affected by the table update without delay. Therefore, reduction in throughput can be suppressed and occurrence of mismatch caused by table update can be reduced.

Particularly, because packets to be reprocessed are narrowed down by an entry size, the queue for reprocessing can be minimized, and discard of queue can be suppressed even if a reprocessing queue is small.

Furthermore, when reprocessing packets that have been suspended to be processed, phases in which processing has been done can be bypassed, thereby enabling to use pipeline resources effectively.

Although a case of updating two tables has been explained in the present embodiment, the function of the present embodiment is applicable to update of three or more tables. When three or more tables are updated, the mismatch avoidance time may cover a period until when processing using an update entry in the latest phase is finished for a packet that has been processed using an update entry in the earliest phase.

First Modification

Next, a first modification of the first embodiment is explained. The present modification differs from the first embodiment in that a content of an update entry is updated at the time of setting the update flag of the update entry. The switch 1 according to the present modification is also depicted by the block diagram in FIG. 1.

Figure 7:
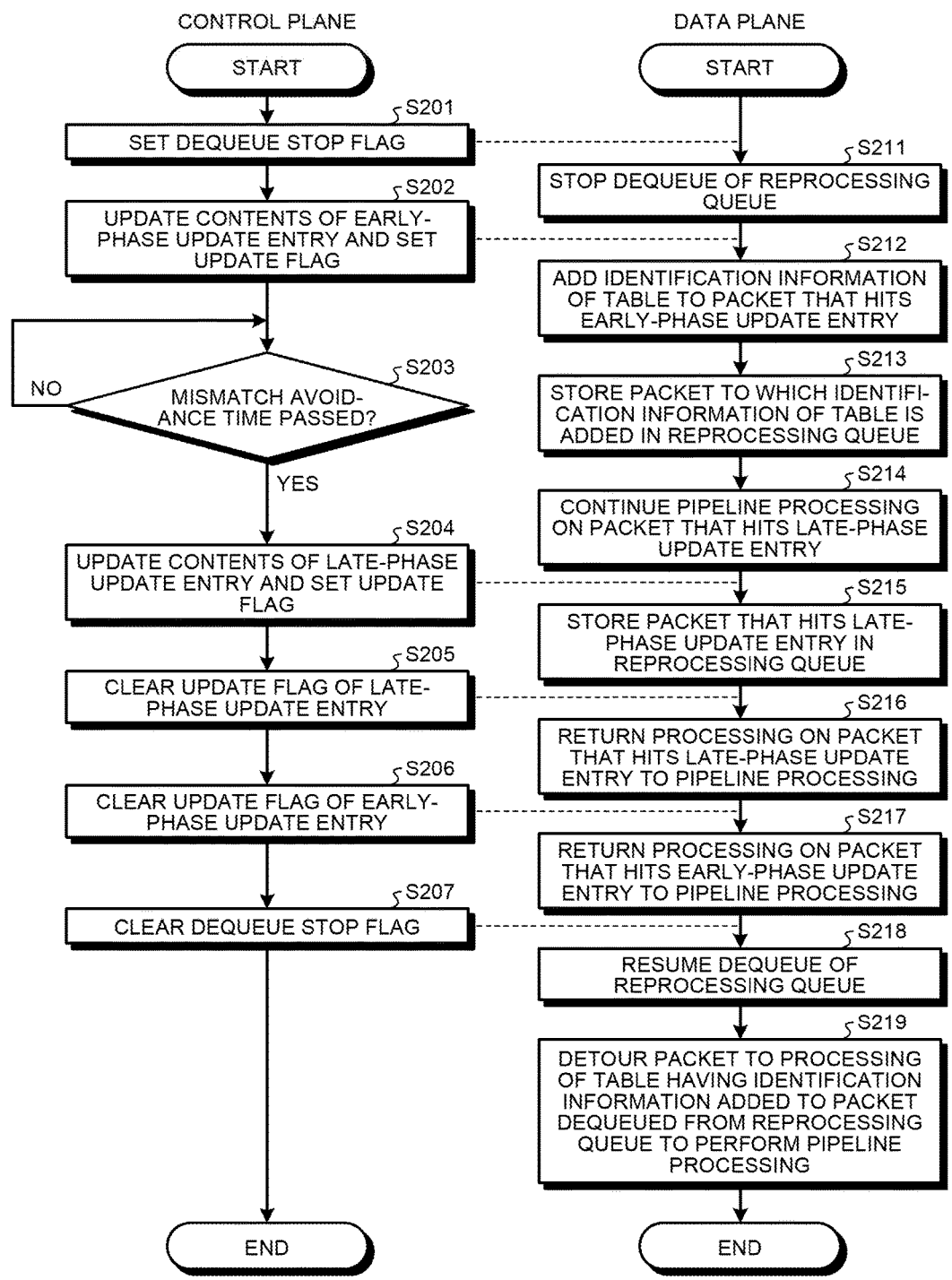
FIG. 7 is a flowchart of processing at the time of table update performed by a network processor according to a first modification.

Referring to FIG. 7, a flow of processing at the time of table update performed by a network processor according to the present modification is explained. FIG. 7 is a flowchart of processing at the time of table update performed by the network processor according to the first modification.

The managing unit 11 of the switch 1 sets the dequeue stop flag of the dequeue-information storage unit 105 to on when table update occurs (step S201).

Subsequently, the managing unit 11 updates a content of an early-phase update entry, and sets the update flag (step S202).

Subsequently, the managing unit 11 determines whether the mismatch avoidance time has passed (step S203). When the mismatch avoidance time has not passed (step S203: NO), the managing unit 11 returns to step S203 to be on standby.

On the other hand, when the mismatch avoidance time has passed (step S203: YES), the managing unit 11 updates a content of a late-phase update entry, and sets the update flag (step S204).

Subsequently, the managing unit 11 clears the update flag of the late-phase update entry (step S205).

Subsequently, the managing unit 11 clears the update flag of the early-phase update entry (step S206).

Thereafter, the managing unit 11 clears the dequeue stop flag of the dequeue-information storage unit 105 (step S207).

On the other hand, in the data plane 10, following processing is performed. The reprocessing control unit 112 confirms that the dequeue stop flag of the dequeue-information storage unit 105 is on, and stops dequeue of the reprocessing queue 104 (step S211).

The packet processing unit 111 confirms that the update flag of an early-phase update entry is on, and suspends processing for a packet that hits the early-phase update entry, and adds identification information of the table (step S212).

The packet processing unit 111 outputs the packet to which the identification information of the table is added to the reprocessing control unit 112. The reprocessing control unit 112 stores the input packet in the reprocessing queue 104 (step S213).

Furthermore, the packet processing unit 111 continues to subject the packet that hit the late-phase update entry to the pipeline processing during the mismatch avoidance time (step S214).

Thereafter, the packet processing unit 111 confirms that the update flag of the late-phase update entry is set to on, and outputs the packet that hits the late-phase update entry to the reprocessing control unit 112. The reprocessing control unit 112 stores the input packet in the reprocessing queue 104 (step S215).

Subsequently, the packet processing unit 111 confirms that the update flag of the late-phase update entry is cleared, and returns the processing for the packet that hits the late-phase update entry to the pipeline processing (step S216).

Furthermore, the late-phase update entry packet processing unit 111 confirms that the update flag of the early-phase update entry is cleared, and returns the processing for the packet that hits the early-phase update entry to the pipeline processing (step S217).

The reprocessing control unit 112 confirms that the dequeue stop flag of the dequeue-information storage unit 105 is off, and starts dequeue of the reprocessing queue 104 (step S218).

Thereafter, acquiring a packet dequeued from the reprocessing queue 104, the packet processing unit 111 detours the packet bypassing to processing using the table having the identification information that is added to the packet, to perform the pipeline processing (step S219).

As explained above, the network processor according to the present modification updates a content of a table at the time of setting an update flag. As described, reduction in throughput can be suppressed and mismatch caused by table update can be reduced in either case of updating a content at the time of setting or clearing an update flag.

(b) Second Embodiment

Figure 8:
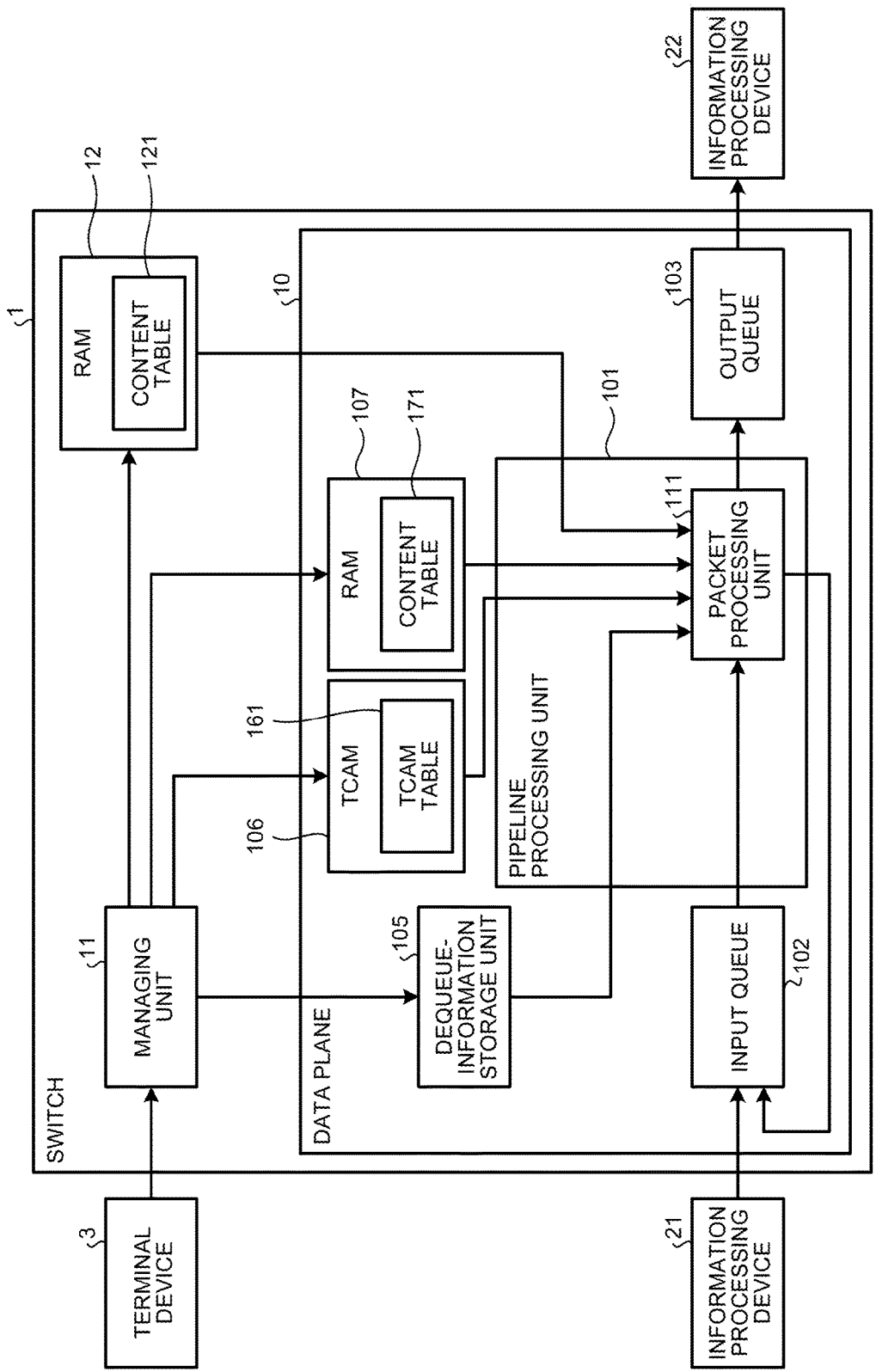
FIG. 8 is a block diagram of a switch according to a second embodiment.

FIG. 8 is a block diagram of a switch according to a second embodiment. A network processing according to the second embodiment differs from the first embodiment in assigning a serial number to a packet that hits an update entry and directly transferring the packet to the input queue 102. In the following explanation, explanation about the same functions as those of the respective components in the first embodiment is omitted. In the following, a case of performing processing with the content table 121 that is followed by processing with the content table 171 is explained.

The packet processing unit 111 checks whether an update entry of the content table 121 is hit in the pipeline processing, based on an update flag of an entry of the content table 121.

When a packet hits an update entry, the packet processing unit 111 assigns a serial number to the packet that hits the update entry, sequentially. The packet processing unit 111 detours the packet with the serial number assigned until all phases are completed, and transfers the packet to the input queue 102. The packet processing unit 111 continues assignment of a serial number to a packet that hits the update entry and transfer to the input queue 102 until the dequeue stop flag of the dequeue-information storage unit 105 is cleared.

When the dequeue stop flag of the dequeue-information storage unit 105 is cleared, the packet processing unit 111 checks identification information of a table added to the packet. The packet processing unit 111 then detours the packets bypassing to processing using the content table 121 in ascending order of serial number, and resumes the pipeline processing from the processing using the content table 121.

Figure 9:
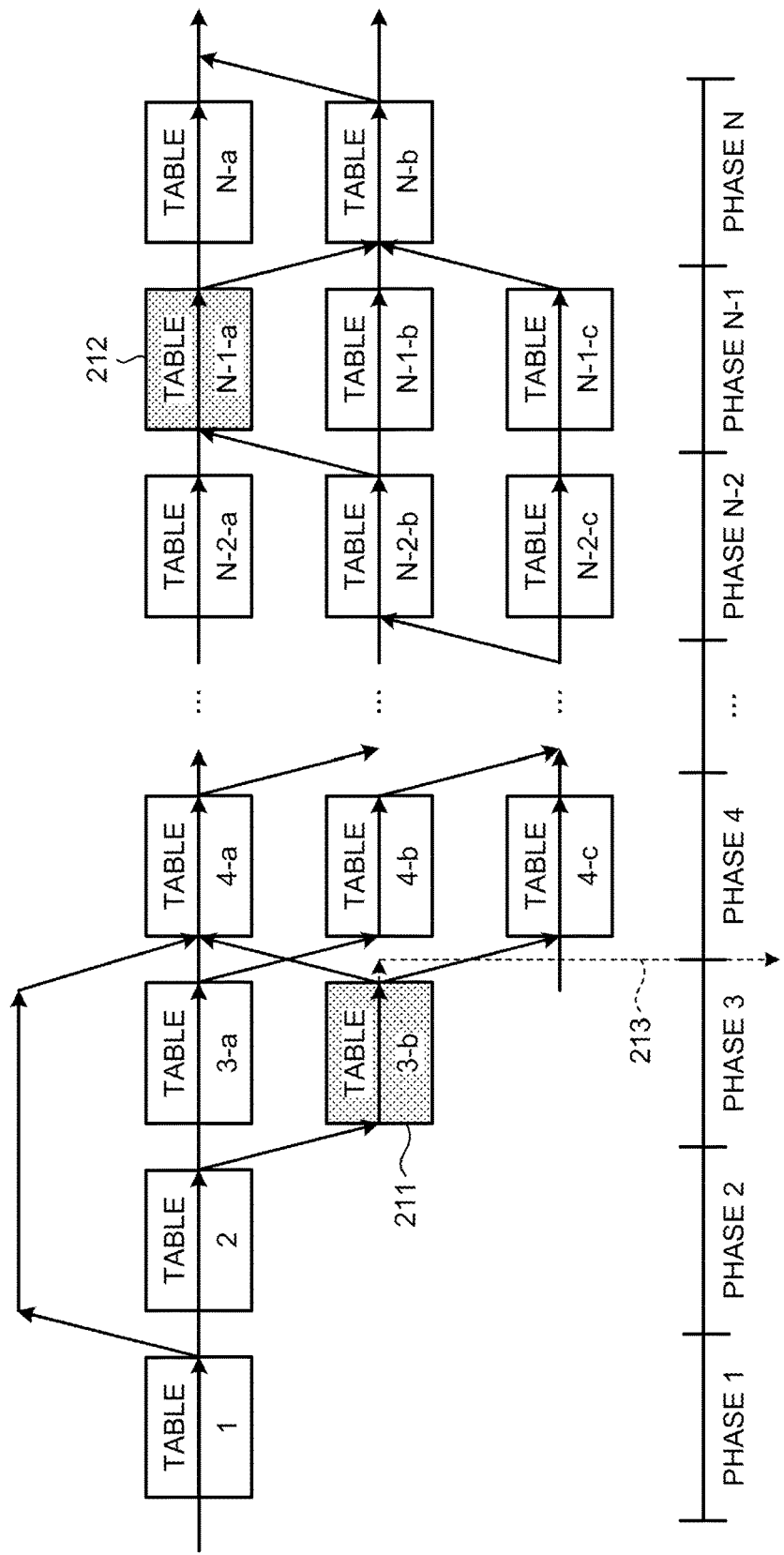
FIG. 9 depicts one example of pipeline processing during table update by a network processor according to the second embodiment.

Next, referring to FIG. 9, processing at the time of table update according to the present embodiment is specifically explained. FIG. 9 depicts one example of the pipeline processing during table update performed by the network processor according to the second embodiment. The table 3-b used in processing 211 is the content table 121 stored in the RAM 12, and the table N-1-a used in processing 212 is the content table 171 stored in the RAM 107.

The packet processing unit 111 determines whether an update flag is added at the time of performing the processing 211 using an entry of the content table 121. The update flag is not added when an update entry in the content table 121 is not updated, and accordingly, the packet processing unit 111 subjects the packet to the processing 211 and proceeds to a next phase.

On the other hand, when the entry used for the packet in the processing 211 is an update entry and the update flag is added, the packet processing unit 111 suspends the processing of the packet, and puts the packet that hits the update entry on standby during Phase 3. Thereafter, the packet processing unit 111 adds identification information of the table 3-b and a serial number to that packet that hits the update entry, that is, the packet suspended to be processed. The packet processing unit 111 transfers the packet suspended to be processed to the input queue 102. A broken arrow 213 in FIG. 9 expresses transfer of the packet suspended to be processed to the input queue 102. The packet processing unit 111 keeps transferring packets that hit the update entry to the input queue 102 until the update flag of the update entry of the content table 121 is cleared.

Figure 10:
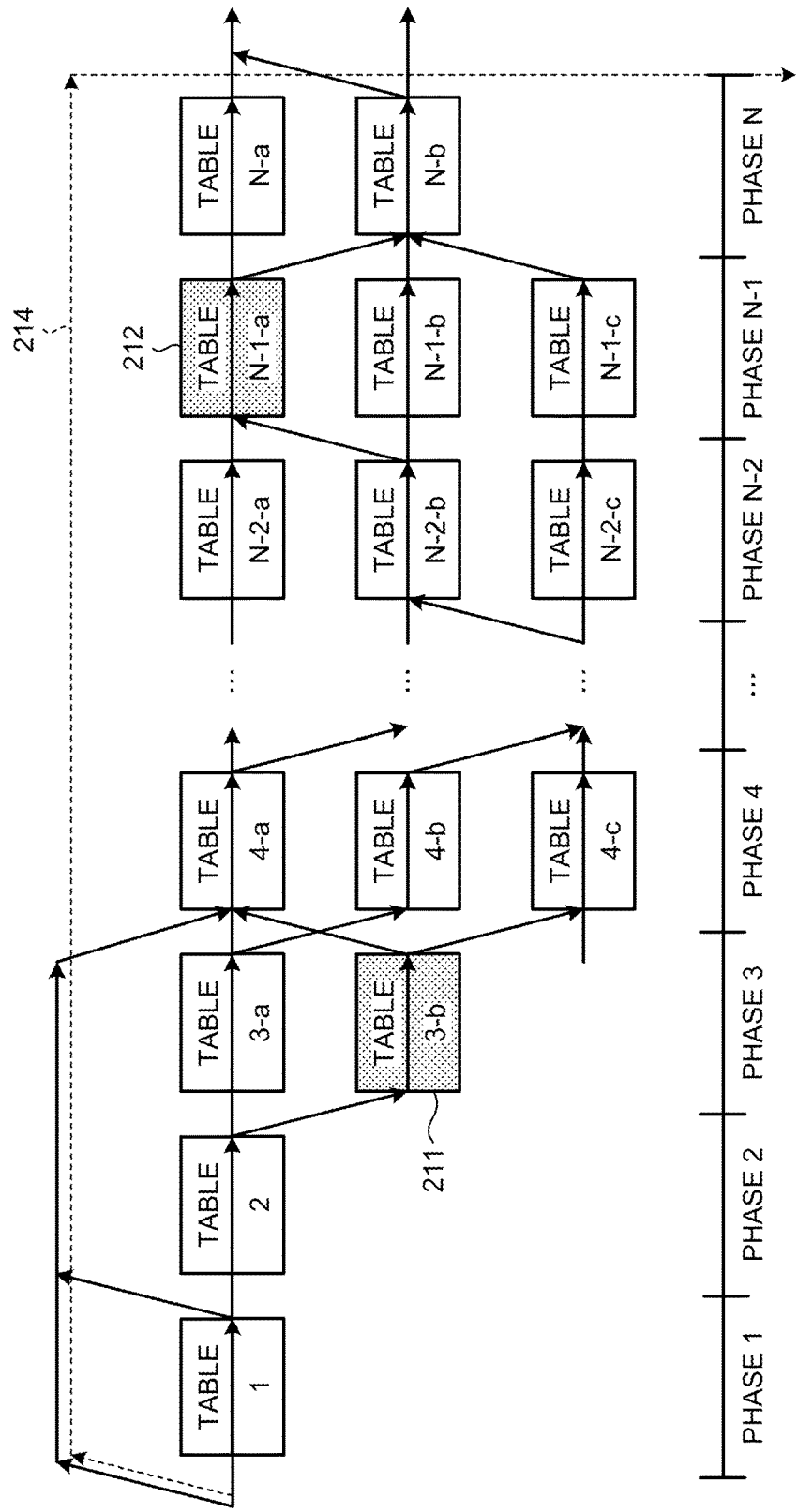

The packet processing unit 111 continues to perform the processing 212 of a packet using the table N-1-a during the mismatch avoidance time, while transmitting the packets that hit the update entry of the processing 211 to the reprocessing control unit 112. During this time, the packets that have been suspended to be processed and transferred to the input queue 102 are sent to the pipeline. The packet processing unit 111 determines whether a serial number is assigned to a packet acquired from the input queue 102. When a serial number is not assigned, the packet processing unit 111 subjects the packet to the normal pipeline processing. On the other hand, when a serial number is assigned, the packet processing unit 111 confirms that the dequeue stop flag is on. The packet processing unit 111 then detours a packet with a serial number assigned thereto, bypassing processing in all phases, as depicted by a broken arrow 214 in FIG. 10, so that the packet is to be on standby until after the final phase. Thereafter, the packet processing unit 111 transfers the packet to the input queue 102 again. FIG. 10 depicts processing performed on a packet to which a serial number is added when the dequeue stop flag is on. As described, in the present embodiment, the packet processing unit 111 makes a packet suspended to be processed circulate in the pipeline without subjecting to processing during a period when the dequeue stop flag is on.

Thereafter, when the mismatch avoidance time passes, the update flag of the update entry of the content table 171 becomes on. The packet processing unit 111 adds identification information of the table and a serial number to a packet that hits the update entry in the processing 212 and transfers the packet to the input queue 102. The serial number that is added to the packet that hits the update entry in the processing 211 and the serial number that is added to the packet that hits the update entry in the processing 212 are serial numbers independent of each other. In this case also, the packet that hits the update entry in the processing 212 circulates in the pipeline without being subjected to processing as depicted in FIG. 10. However, if the mismatch avoidance time is provided sufficiently and there is no packet remaining between the processing 211 and the processing 212, a packet is not supposed to hit the update entry in the processing 212 in an actual case. Therefore, if the mismatch avoidance time is provided sufficiently, the packet processing unit 111 is not required to transfer a packet that hits an update entry in the processing 212 to the input queue 102.

Thereafter, when the update entry in the content table 171 is updated, the update flag of the update entry of the content table 171 is cleared. The packet processing unit 111 returns to the state of performing the processing using the table N-1-a on the packet input in the processing 212.

Thereafter, when the update entry of the content table 121 is updated, the update flag of the update entry of the content table 121 is cleared. The reprocessing control unit 112 returns to the state of performing the processing using the table 3-b on the packet input in the processing 211.

Figure 11:
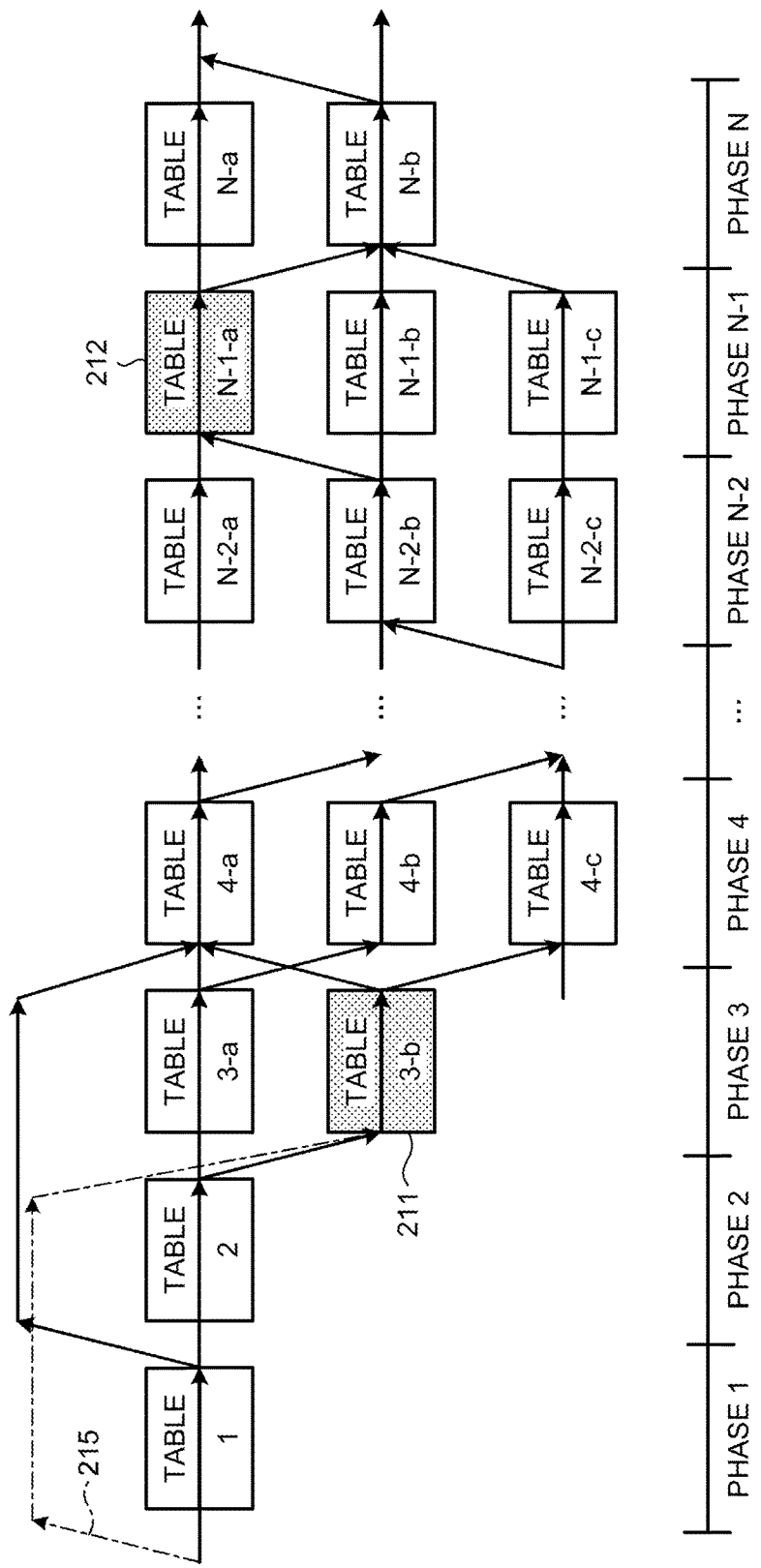
FIG. 11 is a diagram for explaining a flow of processing performed on a packet suspended to be processed after table update in the second embodiment.

Thereafter, when the dequeue stop flag is cleared, the packet processing unit 111 identifies a packet having a serial number assigned thereto among packets acquired from the input queue 102. The packet processing unit 111 then detours packets bypassing to the phases before the processing 211 as indicated by a long-and-short dashed arrow 215 in FIG. 11 in ascending order of serial number assigned to packets suspended to be processed in the processing 211, and resumes the pipeline processing from the processing 211. FIG. 11 is a diagram for explaining a flow of processing performed on a packet suspended to be processed after table update in the second embodiment.

Figure 12:
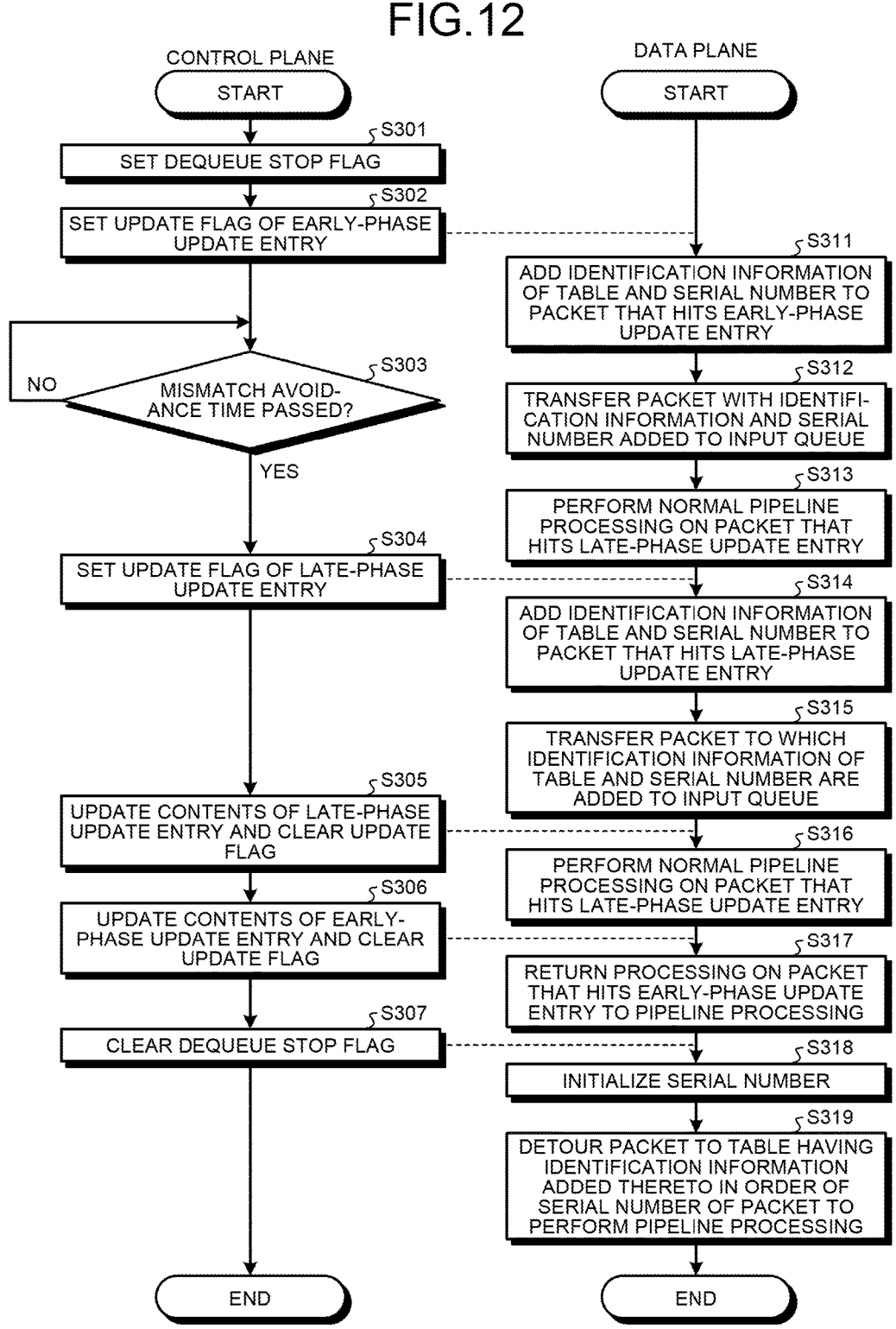
FIG. 12 is a flowchart of processing at the time of table update performed by the network processor according to the second embodiment.

Next, a flow of processing at the time of table update performed by the network processor according to the present embodiment is explained referring to FIG. 12. FIG. 12 is a flowchart of processing at the time of table update performed by the network processor according to the second embodiment.

The managing unit 11 of the switch 1 sets the dequeue stop flag of the dequeue-information storage unit 105 to on when table update occurs (step S301).

Subsequently, the managing unit 11 sets the update flag of the early-phase update entry (step S302).

Subsequently, the managing unit 11 determines whether the mismatch avoidance time has passed (step S303). When the mismatch avoidance time has not passed (step S303: NO), the managing unit 11 returns to step S303 to be on standby.

On the other hand, when the mismatch avoidance time has passed (step S303: YES), the managing unit 11 sets the update flag of the late-phase update entry (step S304).

Subsequently, the managing unit 11 updates a content of the late-phase update entry, and clears the update flag (step S305).

Subsequently, the managing unit 11 updates a content of the early-phase update entry, and clears the update flag (step S306).

Thereafter, the managing unit 11 clears the dequeue stop flag of the dequeue-information storage unit 105 (step S307).

The packet processing unit 111 confirms that the update flag of the early-phase update entry is on, suspends processing on a packet that hits the early-phase update entry, and adds identification information of the table and a serial number to the packet (step S311).

The packet processing unit 111 then transfers the packet to which the identification information of the table and the serial number are added to the input queue 102 (step S312).

Furthermore, the packet processing unit 111 continues the normal pipeline processing on a packet that his the late-phase update entry during a period of the mismatch avoidance time (step S313).

Thereafter, the packet processing unit 111 confirms that the update flag of the late-phase update entry is set, and adds identification information of the table and a serial number to the packet that his late-phase update entry (step S314).

Subsequently, the packet processing unit 111 transfers the packet to which the identification information of the table and the serial number are added to the input queue 102 (step S315).

Thereafter, the packet processing unit 111 confirms that the update flag of the late-phase update entry is cleared, and returns processing on the packet that hits the late-phase update entry to the normal pipeline processing (step S316).

Moreover, the packet processing unit 111 confirms that the update flag of the early-phase update entry is cleared, and returns processing on the packet that hits the early-phase update entry to the normal pipeline processing (step S317).

Thereafter, the packet processing unit 111 initializes the serial number issued by itself (step S318).

Thereafter, the packet processing unit 111 detours packets to the table having identification information assigned thereto, and performs the normal pipeline processing thereafter (step S319).

Figure 13:
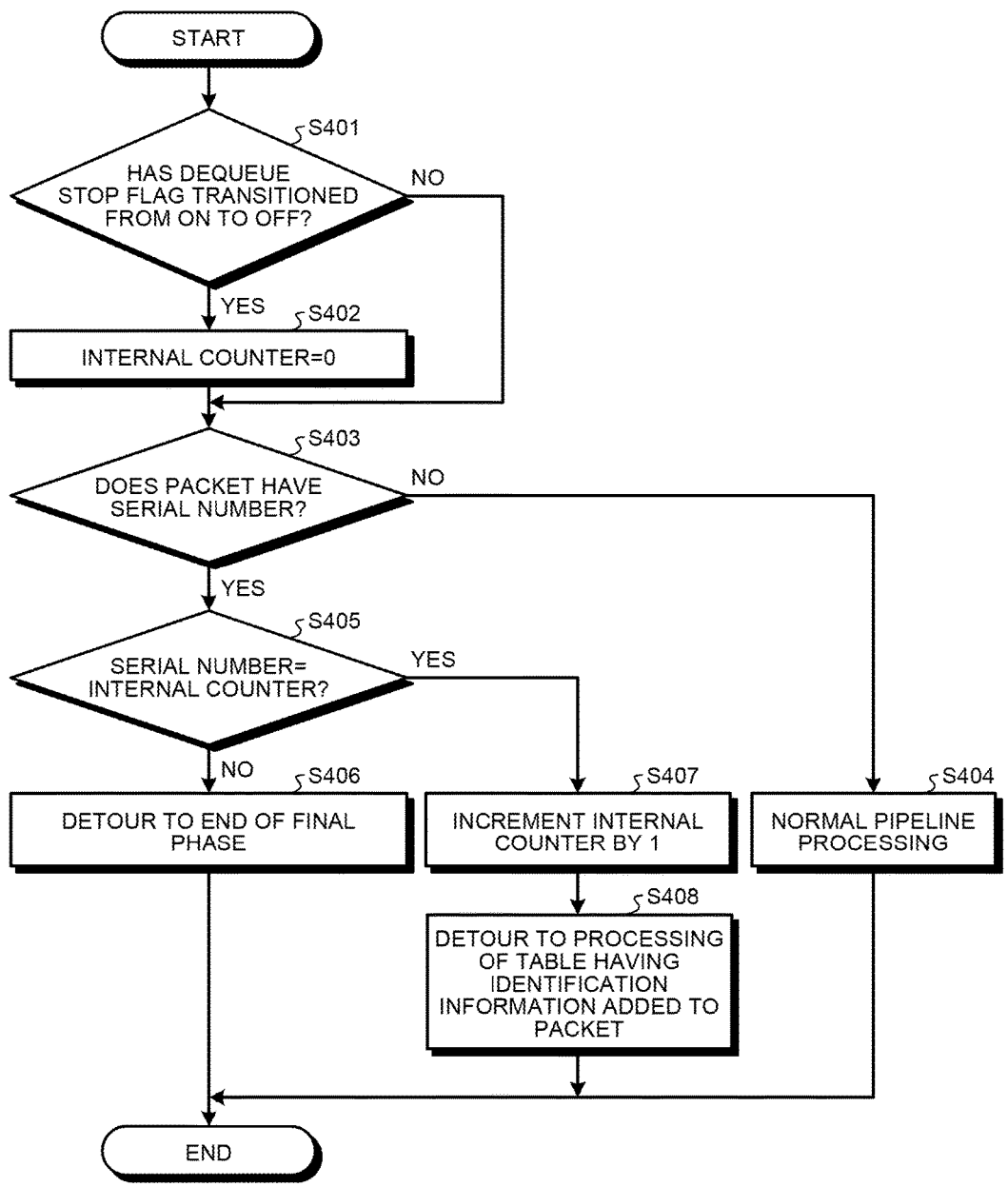
FIG. 13 is a flowchart of processing performed on a packet that is input to a pipeline.

Next, processing performed on a packet that is input to the pipeline is further explained referring to FIG. 13. FIG. 13 is a flowchart of processing performed on a packet that is input to the pipeline.

The packet processing unit 111 refers to the dequeue-information storage unit 105, and determines whether the dequeue stop flag has transitioned from on to off (step S401).

When the dequeue stop flag is on or remains to be off (step S401: NO), the packet processing unit 111 proceeds to step S403. On the other hand, when the dequeue stop flag has transitioned from on to off (step S401: YES), the packet processing unit 111 activates an internal counter, and sets a value of the internal counter to 0 (step S402).

The packet processing unit 111 determines whether a serial number is assigned to a packet acquired from the input queue 102 (step S403). When a serial number is not assigned (step S403: NO), the packet processing unit 111 subjects the packet to the normal pipeline processing (step S404).

On the other hand, when a serial number is assigned (step S403: YES), the packet processing unit 111 determines whether the serial number agrees with the internal counter (step S405). A case of assigning the serial number from 0 by the packet processing unit 111 is explained. Moreover, if the internal counter is not activated at step S402, the internal counter has no value. In that case, the packet processing unit 111 determines that the serial number and the internal counter do not agree with each other.

When the serial number and the value of the internal counter do not agree with each other (step S405: NO), the packet processing unit 111 detours the packet to the end of the final phase, and transfers the packet to the input queue 102 (step S406).

On the other hand, when the serial number agrees with the internal counter (step S405: YES), the packet processing unit 111 increments the internal counter by 1 (step S407). The packet processing unit 111 then detours the packet to the processing of the table having the identification information added to the packet, and resumes the pipeline processing (step S408).

As explained above, the network processor according to the present embodiment assigns a serial number to packets, circulates the packets without subjecting the packets to the pipeline processing until table update is finished, and resumes the pipeline processing from suspended processing after the table update is completed, in order of serial number.

Thus, a reprocessing queue is not required to be newly provided, and cost and the size can be reduced. Moreover, by designing the input queue to have a size capable of handling a state of a line being fully used, the input queue has a margin in a normal state, and discarded packets at the time of table update can be reduced.

Moreover, it enables to make the most out of a packet memory in a pipeline, and to achieve saving of a queue and effective use of resources. Furthermore, by assigning a serial number to a packet that is suspended to be processed, order of packets to be processed at the time of reprocessing can be maintained.

Second Modification

Next, a second modification of the second embodiment is explained. The present modification differs from the second embodiment in that a content of an update entry are updated at the time of setting an update flag of the update entry. The switch 1 according to the present modification is also depicted by the block diagram in FIG. 8.

A flow of processing at the time of table update performed by a network processor according to the present modification is explained referring to FIG. 14. FIG. 14 is a flowchart of processing at the time of table update performed by the network processor according to the second modification.

When table update occurs, the managing unit 11 of the switch 1 sets the dequeue stop flag of the dequeue-information storage unit 105 (step S501).

Subsequently, the managing unit 11 updates a content of an early-phase update entry, and sets the update flag (step S502).

Subsequently, the managing unit 11 determines whether the mismatch avoidance time has passed (step S503). When the mismatch avoidance time has not passed (step S503: NO), the managing unit 11 returns to step S503 to be on standby.

On the other hand, when the mismatch avoidance time has passed (step S503: YES), the managing unit 11 updates a content of a late-phase update entry, and sets the update flag (step S504).

Subsequently, the managing unit 11 clears the update flag of the late-phase update entry (step S505).

Subsequently, the managing unit 11 clears the update flag of the early-phase update entry (step S506).

Thereafter, the managing unit 11 clears the dequeue stop flag of the dequeue-information storage unit 105 (step S507).

Thereafter, the managing unit 11 confirms that the update flag of the early-phase update entry is on, suspends processing performed on a packet that hits the early-phase update entry, and adds identification information of the table and a serial number to the packet (step S511).

The packet processing unit 111 transfers the packet to which the identification information of the table and the serial number are added to the input queue 102 (step S512).

Furthermore, the packet processing unit 111 continues the normal pipeline processing on a packet that hits the late-phase update entry during a period of the mismatch avoidance time (step S513).

Thereafter, the packet processing unit 111 confirms that the update flag of the late-phase update entry becomes on, and adds identification information of the table and a serial number to the packet that hits the late-phase update entry (step S514).

Subsequently, the packet processing unit 111 transfers the packet to which the identification information of the table and the serial number are added to the input queue 102 (step S515).

Thereafter, the packet processing unit 111 confirms that the update flag of the late-phase update entry is cleared, and returns processing performed on the packet that hits the late-phase update entry to the normal pipeline processing (step S516).

Furthermore, the packet processing unit 111 confirms that that the update flag of the early-phase update entry is cleared, and returns processing performed on the packet that hits the early-phase update entry to the normal pipeline processing (step S517).

Thereafter, the packet processing unit 111 initializes the serial number issued by itself (step S518).

Thereafter, the packet processing unit 111 detours packets to the table having identification information assigned thereto in order of serial number of the packets, and performs the normal pipeline processing thereafter (step S519).

As explained above, the network processor according to the present modification updates a content of a table at the time of setting the update flag. As described, reduction in throughput can be suppressed and mismatch caused by table update can be reduced in either case of updating a content at the time of setting or clearing an update flag.

According to one aspect of the network processor, the communication device, the packet transfer method, and the computer-readable recording medium disclosed in the present application, throughput degradation can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network processor comprising:
a managing unit that adds update information to an entry to be updated of a table updated prior to a change of a network configuration, and that deletes the update information when the update of the table caused by the change of the network configuration is completed;
a packet processing unit that executes a plurality of pipeline processes using the table in sequence for a packet input to an input queue, and that suspends executing the pipeline processes when the update information is added to any entry of the table; and
a reprocessing control unit that stores an input packet in a reprocessing queue when the pipeline processes executed by the packet processing unit is suspended, and that transfers the packet stored in the reprocessing queue to the input queue when update of the table to which the update information is added is all completed.

2. The network processor according to claim 1, wherein
the managing unit informs stop of dequeue of the reprocessing queue to the reprocessing control unit when the update of the table is performed, and informs start of dequeue of the reprocessing queue to the reprocessing control unit when the update of the table to which the update information is added is all completed, and
the reprocessing control unit holds the packet in the reprocessing queue when stop of the dequeue is informed by the managing unit, and transfers the packet stored in the reprocessing queue to the input queue when start of dequeue is informed by the managing unit.

3. The network processor according to claim 1, wherein the packet processing unit suspends executing the pipeline processes, when a plurality of the tables to which the update information is added are present, in the table for which the pipeline processes are executed earliest in order among the tables.

4. The network processor according to claim 3, wherein the packet processing unit adds identification information of the table having earliest order of executing the pipeline processes to the packet, and bypasses the pipeline processes to be detoured to the table having the identification information, for the packet that is transferred from the reprocessing queue to the input queue.

5. The network processor according to claim 1, wherein
the managing unit adds the update information per entry that is updated in the table,
the packet processing unit suspends executing the pipeline processes when an entry to which the update information is added in the table is used in the pipeline processes, and
the reprocessing control unit transfers the packet stored in the reprocessing queue to the input queue when update of all entries to which the update information is added in the table is completed.

6. A network processor comprising:
a managing unit that adds update information to an entry to be updated of a table updated prior to a change of a network configuration, and that deletes the update information when the update of the table caused by the change of the network configuration is completed; and
a packet processing unit that executes a plurality of pipeline processes using the table in sequence for a packet input to an input queue, and that suspends executing the pipeline processes when the update information is added to any entry of the table, that assigns a serial number to the packet, that transfers to the input queue, and that executes the pipeline processes for the packet in order of the serial number when update of the table to which the update information is added is all completed.

7. A communication apparatus comprising:
a managing unit that adds update information to an entry to be updated of a table updated prior to a change of a network configuration, and that deletes the update information when the update of the table caused by the change of the network configuration is completed;
a packet processing unit that executes a plurality of pipeline processes using the table in sequence for a packet input to an input queue, and that suspends executing the pipeline processes when the update information is added to any entry of the table; and
a reprocessing control unit that stores an input packet in a reprocessing queue when the pipeline processes executed by the packet processing unit is suspended, and that transfers the packet stored in the reprocessing queue to the input queue when update of the table to which the update information is added is all completed.

8. A packet transfer method comprising:
sequentially executing a plurality of pipeline processes using a table on a packet input to an input queue;
adding update information to an entry to be updated in a table updated prior to a change of a network configuration;

suspending executing the pipeline processes when the update information is added to an entry of the table that is used in the pipeline processes executed on an input packet;

storing the input packet in a reprocessing queue when the pipeline processes is suspended;

transferring the packet stored in the reprocessing queue to the input queue, when update of the table to which the update information is added is all completed; and resuming executing the pipeline processes on the packet transferred to the input queue from the reprocessing queue.

9. A non-transitory computer-readable recording medium having stored therein a program that causes a computer to execute:

sequentially executing a plurality of pipeline processes using a table on a packet input to an input queue;

adding update information to an entry to be updated in a table updated prior to a change of a network configuration;

suspending executing the pipeline processes when the update information is added to an entry of the table that is used in the pipeline processes executed on an input packet;

storing the input packet in a reprocessing queue when the pipeline processes is suspended;

transferring the packet stored in the reprocessing queue to the input queue, when update of the table to which the update information is added is all completed; and resuming executing the pipeline processes on the packet transferred to the input queue from the reprocessing queue.

* * * * *